United States Patent
Huh et al.

(10) Patent No.: US 10,868,850 B2
(45) Date of Patent: Dec. 15, 2020

(54) APPARATUS AND METHOD FOR PROVIDING CONTENTS USING WEB-BASED VIRTUAL DESKTOP PROTOCOL

(71) Applicant: UNIVERSITY-INDUSTRY COOPERATION GROUP OF KYUNG HEE UNIVERSITY, Yongin (KR)

(72) Inventors: Eui Nam Huh, Yongin (KR); Ja Hun Ku, Suwon (KR)

(73) Assignee: UNIVERSITY-INDUSTRY COOPERATION GROUP OF KYUNG HEE UNIVERSITY, Yongin (KR)

(*) Notice: Subject to any disclaimer, the term of this patent is extended or adjusted under 35 U.S.C. 154(b) by 127 days.

(21) Appl. No.: 16/081,004

(22) PCT Filed: Dec. 15, 2016

(86) PCT No.: PCT/KR2016/014706
§ 371 (c)(1),
(2) Date: Aug. 29, 2018

(87) PCT Pub. No.: WO2017/150792
PCT Pub. Date: Sep. 8, 2017

(65) Prior Publication Data
US 2019/0037000 A1 Jan. 31, 2019

(30) Foreign Application Priority Data
Feb. 29, 2016 (KR) .................. 10-2016-0024169

(51) Int. Cl.
*H04L 29/06* (2006.01)
*H04N 21/2662* (2011.01)
(Continued)

(52) U.S. Cl.
CPC .......... *H04L 65/607* (2013.01); *G06F 3/1454* (2013.01); *G06F 16/9574* (2019.01);
(Continued)

(58) Field of Classification Search
CPC .............. G06F 3/1454; G06F 16/9574; H04L 43/0817; H04L 65/607; H04L 65/80;
(Continued)

(56) References Cited

U.S. PATENT DOCUMENTS 7,171,444 B2 * 1/2007 Deshpande ........... G06F 3/1462
382/236
8,180,905 B2 * 5/2012 Schmieder ............. G06F 9/545
709/228
(Continued)

FOREIGN PATENT DOCUMENTS

KR 10-2011-0028561 A 3/2011
KR 10-1237505 B1 2/2013
(Continued)

OTHER PUBLICATIONS

Ericom. "Ericom Access Now HTML5 Access for Microsoft Remote Desktop Protocol (RDP) Administrator's Manual Version 3.5", publicly posted Mar. 19, 2015, downloaded from <https://web.archive.org/web/20150319035140/https://www.ericom.com/doc/TechnicalReferences/EricomAccessNowAdminManual.pdf>, 177 pages. (Year: 2015).*
(Continued)

*Primary Examiner* — George C Neurauter, Jr.

(57) ABSTRACT

A method and an apparatus of providing content using a web-based virtual desktop protocol are provided. The method of providing content by the apparatus of using a web-based virtual desktop protocol includes monitoring a network status of a client, adjusting encoding quality of content based on the network status of the client, and
(Continued)

providing the content of the adjusted encoding quality to the client, wherein the content of the adjusted encoding quality is applied through a web browser of the client.

10 Claims, 4 Drawing Sheets

(51) Int. Cl.
| | |
|---|---|
| *H04N 21/2343* | (2011.01) |
| *H04N 21/4782* | (2011.01) |
| *H04N 21/258* | (2011.01) |
| *H04N 21/24* | (2011.01) |
| *G06F 16/957* | (2019.01) |
| *G06F 3/14* | (2006.01) |
| *H04L 12/26* | (2006.01) |

(52) U.S. Cl.
CPC .......... *H04L 43/0817* (2013.01); *H04L 65/80* (2013.01); *H04N 21/2343* (2013.01); *H04N 21/234363* (2013.01); *H04N 21/2402* (2013.01); *H04N 21/25825* (2013.01); *H04N 21/2662* (2013.01); *H04N 21/4782* (2013.01); *H04L 67/42* (2013.01)

(58) Field of Classification Search
CPC ................ H04L 67/42; H04N 21/2343; H04N 21/234363; H04N 21/2402; H04N 21/25825; H04N 21/2662; H04N 21/4782
See application file for complete search history.

(56) References Cited

U.S. PATENT DOCUMENTS

| | | | | |
|---|---|---|---|---|
| 8,385,666 | B2* | 2/2013 | Fagg | G06K 9/36 |
| | | | | 382/239 |
| 8,392,497 | B2* | 3/2013 | Vilke | G06F 9/54 |
| | | | | 709/202 |
| 8,560,593 | B2* | 10/2013 | Ghostine | H04W 8/30 |
| | | | | 709/201 |
| 8,600,155 | B2* | 12/2013 | Fagg | G06K 9/36 |
| | | | | 382/165 |
| 8,676,949 | B2* | 3/2014 | Vilke | G06F 9/54 |
| | | | | 709/223 |
| 8,711,929 | B2* | 4/2014 | Swenson | H04N 21/2402 |
| | | | | 375/240.07 |
| 8,799,477 | B2* | 8/2014 | Burckart | G06F 9/5077 |
| | | | | 709/226 |
| 8,837,824 | B2* | 9/2014 | Fagg | G06K 9/36 |
| | | | | 382/165 |
| 8,918,455 | B2* | 12/2014 | Vilke | G06F 9/54 |
| | | | | 709/203 |
| 8,918,456 | B2* | 12/2014 | Vilke | G06F 9/54 |
| | | | | 709/203 |
| 8,949,463 | B2* | 2/2015 | Kominac | G06F 9/452 |
| | | | | 709/246 |
| 9,183,025 | B2* | 11/2015 | Vilke | G06F 9/54 |
| 9,244,912 | B1* | 1/2016 | Kominac | H04L 67/42 |
| 9,380,562 | B1* | 6/2016 | Vetter | H04W 4/029 |
| 9,395,885 | B1* | 7/2016 | Kominac | G06T 1/60 |
| 9,430,036 | B1* | 8/2016 | Kominac | G06T 11/20 |
| 9,438,917 | B2* | 9/2016 | Xia | H04N 19/115 |
| 9,459,936 | B2* | 10/2016 | Fallows | G06F 9/54 |
| 9,510,048 | B2* | 11/2016 | Kamay | H04N 21/2343 |
| 9,535,560 | B1* | 1/2017 | Kominac | G06F 3/048 |
| 9,582,240 | B2* | 2/2017 | Spracklen | G06F 3/1454 |
| 9,606,769 | B2* | 3/2017 | Khan | G06F 5/12 |
| 9,621,896 | B2* | 4/2017 | Tidemann | H04N 19/176 |
| 9,674,171 | B2* | 6/2017 | Vetter | H04W 4/029 |
| 9,716,740 | B2* | 7/2017 | Fausak | H04L 67/40 |
| 9,986,242 | B2* | 5/2018 | Wei | H04N 19/136 |
| 10,219,013 | B2* | 2/2019 | Chuah | G06T 15/04 |
| 10,248,374 | B2* | 4/2019 | Kominac | G06F 9/452 |
| 10,268,332 | B2* | 4/2019 | Kominac | G06T 11/20 |
| 10,360,046 | B2* | 7/2019 | Spracklen | H04N 1/415 |
| 2004/0228410 | A1 | 11/2004 | Ameres et al. | |
| 2008/0313545 | A1* | 12/2008 | Patel | H04L 29/08846 |
| | | | | 715/738 |
| 2010/0070887 | A1* | 3/2010 | Murrett | G06F 8/38 |
| | | | | 715/760 |
| 2010/0226548 | A1* | 9/2010 | Abdo | G06K 9/00456 |
| | | | | 382/128 |
| 2010/0303146 | A1* | 12/2010 | Kamay | H04N 21/2343 |
| | | | | 375/240.02 |
| 2010/0306413 | A1* | 12/2010 | Kamay | H04N 19/503 |
| | | | | 709/247 |
| 2010/0306771 | A1* | 12/2010 | Kamay | G06F 9/45558 |
| | | | | 718/1 |
| 2011/0126198 | A1* | 5/2011 | Vilke | G06F 9/54 |
| | | | | 718/1 |
| 2011/0161482 | A1* | 6/2011 | Bonola | G06F 9/5077 |
| | | | | 709/223 |
| 2012/0075346 | A1* | 3/2012 | Malladi | H04N 19/46 |
| | | | | 345/660 |
| 2012/0151372 | A1* | 6/2012 | Kominac | G06F 9/452 |
| | | | | 715/740 |
| 2012/0151373 | A1* | 6/2012 | Kominac | G06F 9/452 |
| | | | | 715/740 |
| 2012/0246554 | A1* | 9/2012 | Shappir | G06T 11/60 |
| | | | | 715/234 |
| 2012/0254439 | A1* | 10/2012 | Yamasaki | G06F 9/505 |
| | | | | 709/226 |
| 2012/0317236 | A1 | 12/2012 | Abdo et al. | |
| 2013/0060837 | A1* | 3/2013 | Chakraborty | G06F 3/14 |
| | | | | 709/203 |
| 2013/0339323 | A1* | 12/2013 | Sulieman | H04L 69/04 |
| | | | | 707/693 |
| 2013/0346479 | A1* | 12/2013 | Vilke | G06F 9/54 |
| | | | | 709/203 |
| 2014/0247167 | A1* | 9/2014 | Kalevo | H03M 7/00 |
| | | | | 341/52 |
| 2014/0267090 | A1* | 9/2014 | Heyman | G06T 3/4092 |
| | | | | 345/173 |
| 2014/0267281 | A1* | 9/2014 | Heyman | G06T 3/4092 |
| | | | | 345/428 |
| 2014/0285437 | A1* | 9/2014 | Lu | G06F 3/038 |
| | | | | 345/163 |
| 2014/0344332 | A1* | 11/2014 | Giebler | H04L 67/2823 |
| | | | | 709/203 |
| 2014/0372510 | A1* | 12/2014 | Fausak | H04L 67/40 |
| | | | | 709/203 |
| 2015/0156511 | A1 | 6/2015 | Lundberg | |
| 2015/0288672 | A1* | 10/2015 | Patten | G06F 16/93 |
| | | | | 726/7 |
| 2015/0341472 | A1* | 11/2015 | Yanofski | H04L 69/162 |
| | | | | 709/203 |
| 2016/0072873 | A1* | 3/2016 | Hu | H04L 67/025 |
| | | | | 715/740 |
| 2016/0231869 | A1* | 8/2016 | Kumar | G06F 3/0481 |
| 2018/0167426 | A1* | 6/2018 | Sigurdsson | G06F 3/14 |
| 2018/0234506 | A1* | 8/2018 | Zhang | H04L 67/141 |
| 2019/0037000 | A1* | 1/2019 | Huh | H04L 65/80 |
| 2019/0080000 | A1* | 3/2019 | Munoz | G06F 16/00 |
| 2019/0155861 | A1* | 5/2019 | Klug | G06F 16/957 |

FOREIGN PATENT DOCUMENTS

| | | |
|---|---|---|
| KR | 10-2014-0036220 A | 3/2014 |
| KR | 10-2015-0040872 A | 4/2015 |

OTHER PUBLICATIONS

Vanessa Wang, Frank Salim, and Peter Moskovits. "The Definitive Guide to HTML5 WebSocket", 2013, 199 pages. (Year: 2013).*

Wang Jing, Guan Xuetao, and Zhang Yang. "An Adaptive Encoding Application Sharing System Based on Remote Display", 2013 Third International Conference on Intelligent System Design and Engineering Applications, 4 pages. (Year: 2013).*

(56) References Cited

OTHER PUBLICATIONS

T. Richardson and J. Levine. "Internet Engineering Task Force (IETF) Request for Comments (RFC) 6143: The Remote Framebuffer Protocol", Mar. 2011, 39 pages. (Year: 2011).*
I. Fette and A. Melnikov. "Internet Engineering Task Force (IETF) Request for Comments (RFC) 6455: The WebSocket protocol", Dec. 2011, 71 pages. (Year: 2011).*
Roger Easton. "Basic Principles of Imaging Science II", Chester F. Carlson Center for Imaging Science, Rochester Institute of Technology, Feb. 12, 2005, 560 pages. (Year: 2005).*
Ja-Hun Ku et al.,"A Proposal of VDI Protocol Stucture based Web for Performance Improvement", Proceedings of Symposium of the Korean Institute of communications and Information Sciences, Jun. 2015, p. 820-821, Korea Institute of Communication Sciences.
Jahun Ku et al., "Evaluating Complexity of Image based on Shannon Entropy", 42th Regular general meeting and winter academic presentation, Dec. 17-19, 2015, p. 1076-1077, Korean Institute of Information Scientists and Engineers.
Jahun Ku et al., "WARP: Web-Based Adaptive Remote-Desktop Protocol for VDI", 7th International Conference on Information Science & Applications, Feb. 15-18, 2016, p. 189-194, Ho Chi Minh City (Saigon), Vietnam.
Jahun Ku, "Study on Adaptive Remote Display Protocol for Improving User Experience on Web-based VDI", Thesis for the Degree of Master of Engineering, Feb. 1, 2016, p. 1-28.
International Search Report for PCT/KR2016/014706 filed on Dec. 15, 2016.

* cited by examiner

[Fig. 1]
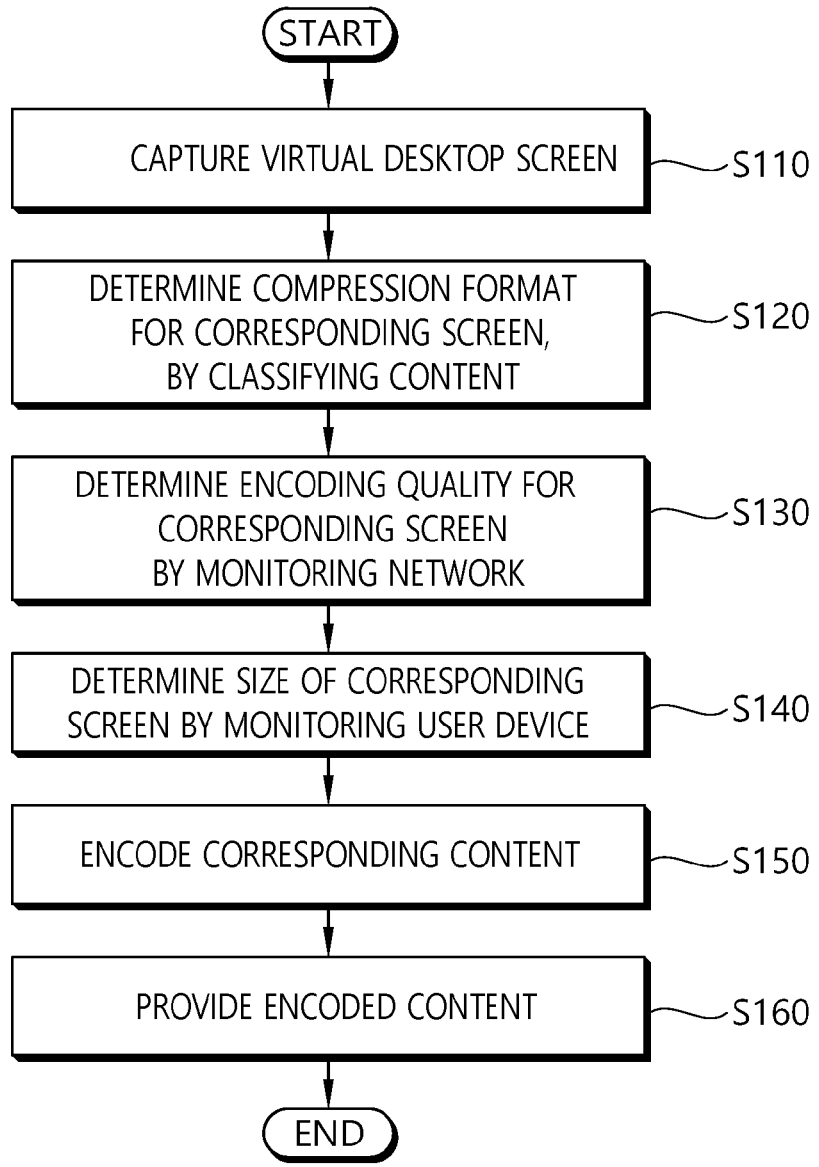

[Fig. 2]
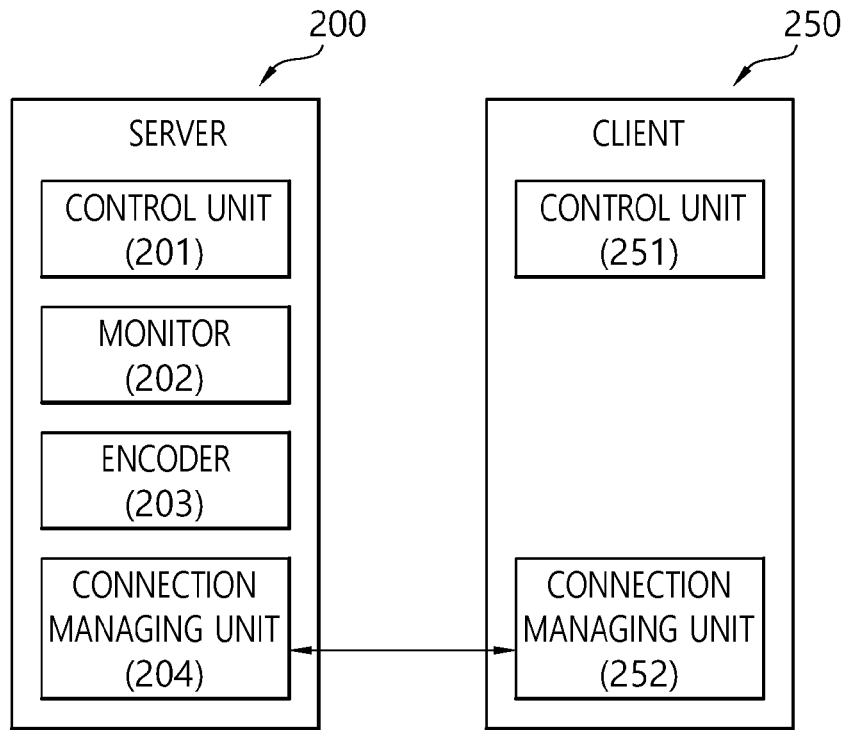
[Fig. 3]
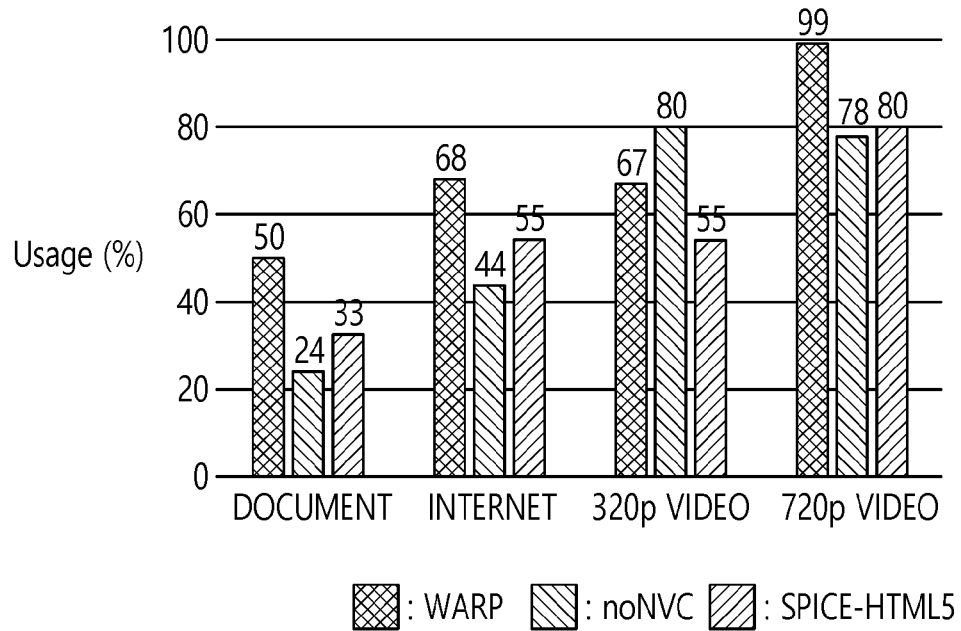

[Fig. 4]
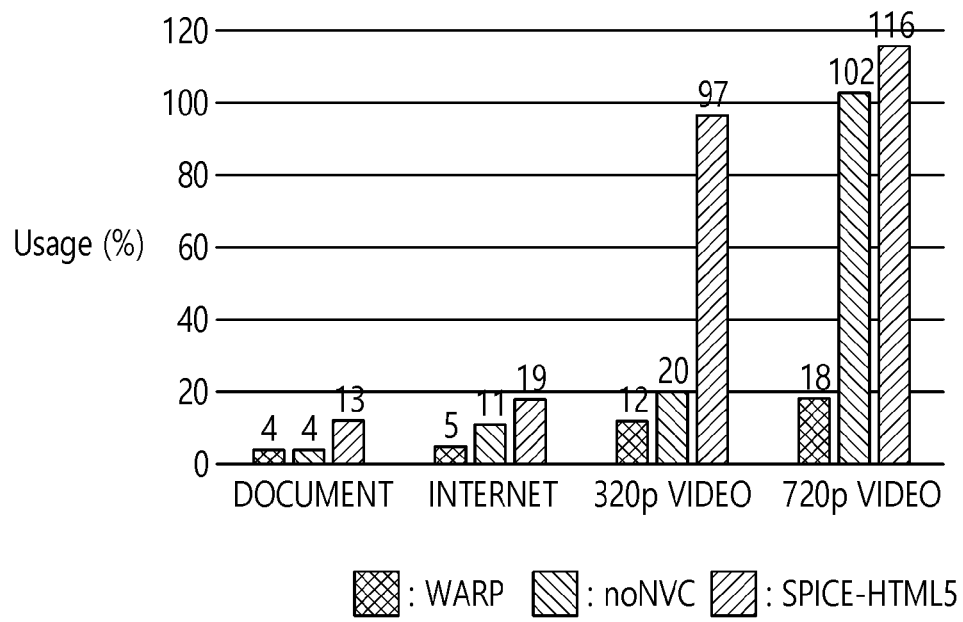
[Fig. 5]
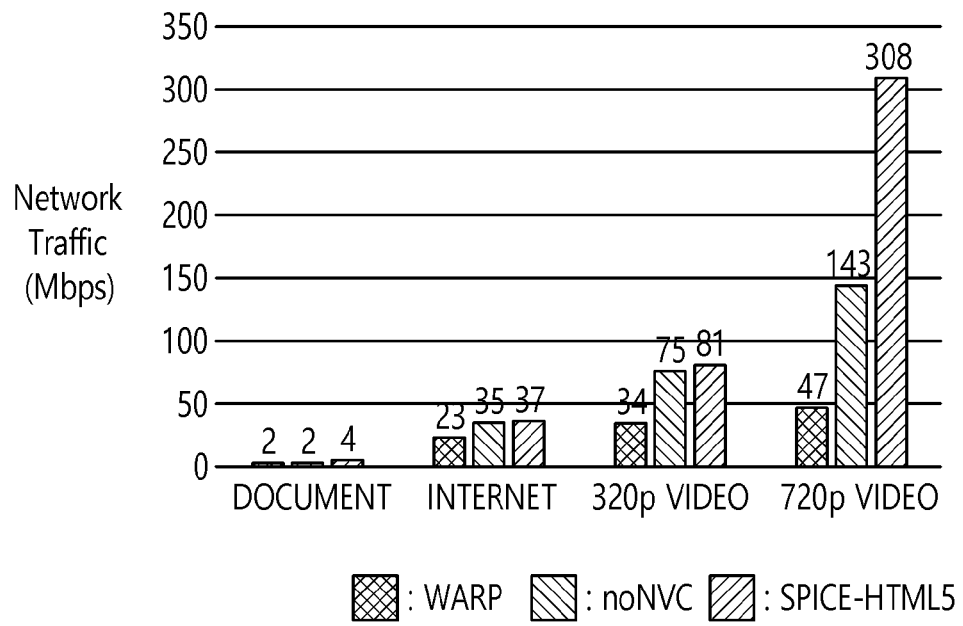

[Fig. 6]
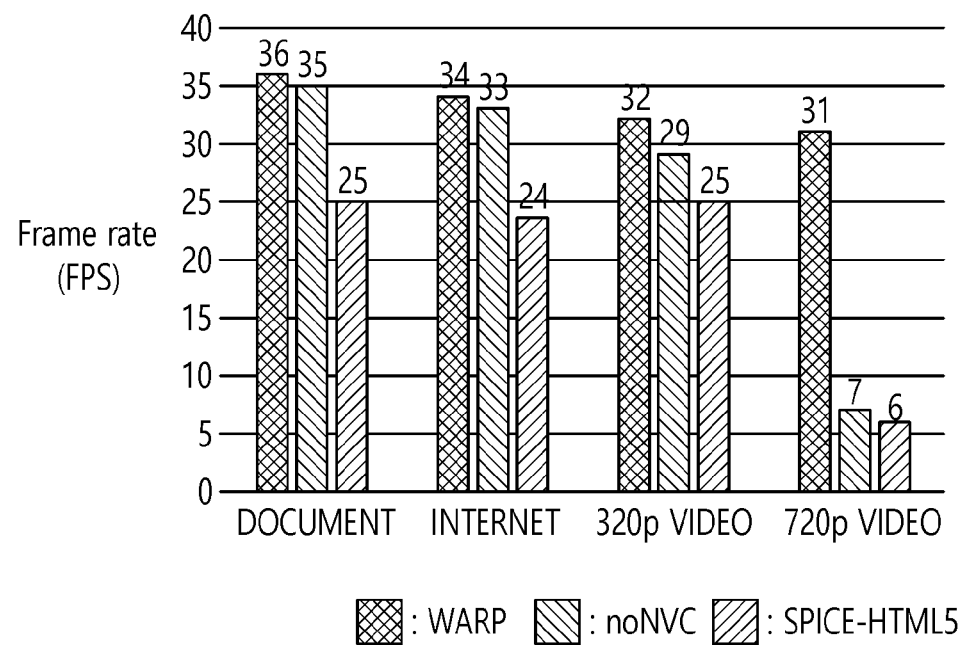

APPARATUS AND METHOD FOR PROVIDING CONTENTS USING WEB-BASED VIRTUAL DESKTOP PROTOCOL

TECHNICAL FIELD

The present invention relates to a virtual desktop protocol suitable for a web environment, and a method and apparatus using the same.

BACKGROUND ART

Virtual Desktop Infrastructure (VDI) provides a user with a virtual desktop that can be used anywhere and anytime. To enable the user at a remote area to experience as if he or she uses a local desktop, performance of a remote desktop protocol is important. However, the remote desktop protocol is not designed in consideration of a web environment, and thus it needs a proxy server to perform communication between a client and a web browser.

For example, Korean Patent Application Publication No. 10-2014-0036220 (Publication Date: Mar. 25, 2014) titled "WEB BROWSER BASED DESKTOP AND APPLICATION REMOTING SOLUTION" discloses that a proxy server exists between a remote presentation server and a client and establishes a remote presentation session comprising a hypertext transfer protocol (HTTP) session with the client, that the proxy server generates graphics encoded by the remote presentation protocol and transmits the graphics to the proxy server, that the proxy server encodes the graphics into a video and transmits the encoded video to the client to be displayed through a web browser, and that a web browser implemented on the client renders a web page including the video and displays the result on a display device of the client. However, rendering is performed at the client side degrades graphic processing performance, compared to the case of using a negative application, and thus it is not an adequate method.

Meanwhile, the existing remote desktop protocols use various formats, such as Raw, Copyrect, and QUIC, to transmit a virtual desktop screen, but a web browser supports only a limited number of formats, such as Joint Photographic Coding Experts Group (JPEG) and Portable Network Graphics (PNG). If a non-supported format is used, a client needs to use an additional decoder which is not optimized for a web environment, thus degrading decoding performance.

In addition, websocket needs to be used for real-time data transmission to a web browser. For websocket communication, the existing technologies utilize a proxy server which causes network delay.

DISCLOSURE OF INVENTION

Technical Problem

An object of the present invention is to provide an apparatus and method of using a web-based virtual desktop protocol which enhances user accessibility and provides improved user experience.

Another object of the present invention is to provide an apparatus and method of using a web-based desktop protocol which is capable of reducing network traffic, regardless of rendering operation performed at a host side.

Another object of the present invention is to provide an apparatus and method of using a web-based virtual desktop protocol of using a protocol which is capable of controlling a virtual desktop at a client side.

Another object of the present invention is to provide an apparatus and method of using a web-based virtual desktop protocol which is capable of removing network delay.

Solution to Problem

In one general aspect of the present invention, there is provided a method of providing content by an apparatus of using a web-based virtual desktop protocol, the method including: monitoring a network status of a client, adjusting encoding quality of the content based on the network status of the client, and providing the content of the adjusted encoding quality to the client, wherein the content of the adjusted encoding quality is displayed through a web browser of the client.

The method may further include, before the adjusting of encoding quality, capturing a screen of a virtual desktop allocated to the client.

The method may further include calculating an entropy value of the captured screen, and determining a compression format for the captured screen based on the calculated entropy value.

The captured screen may be compressed into one of Joint Photographic Coding Experts Group (JPEG) and Portable Network Graphics (PNG).

The determining may include classifying the captured screen using an equation which is derived based on a PNG filter and Shannon Entropy Algorithm.

The network status of the client may be acquired by monitoring a transmission buffer of the apparatus and acquiring a network bandwidth of the client.

The adjusting may include monitoring resolution of the web browser of the client, and adjusting size of the content according to the resolution of the web browser.

The adjusting may include adjusting a frame of the content based on the network status.

The method may further include performing direct communication with the web browser of the client based on websocket.

The performing of direction communication may include receiving control information on at least one of a mouse, a keyboard, and a screen of the virtual desktop from the client, and controlling the mouse, the keyboard, and the screen based on the received control information.

In another general aspect of the present invention, there is provided an apparatus of using a web-based virtual desktop protocol, the apparatus including: a monitor configured to monitor a network status of a client, a control unit configured to control encoding quality of content based on the network status of the client, an encoder configured to encode the content by control of the control unit, and a connection managing unit configured to manage connection with the client, wherein the encoded content is provided to the client and displayed through a web browser of the client.

Advantageous Effects of Invention

By providing a web-based virtual desktop, it is possible to enhance user accessibility and provide improved user experience.

A server is able to adaptively perform encoding based on the network status of a client, so that network traffic may be reduced even when a host performs rendering.

A user is able to control a screen, a keyboard, and a mouse of a virtual desktop via a client.

Websocket-based connection management enables direct communication between a server and a client, so that network delay due to a proxy server may be removed.

BRIEF DESCRIPTION OF DRAWINGS

FIG. 1 is a flowchart illustrating a method of providing content using a web-based virtual desktop protocol according to an embodiment of the present invention.

FIG. 2 is a block diagram illustrating a server and a client, both of which utilize a web-based virtual desktop protocol according to an embodiment of the present invention.

FIG. 3 is a graph for comparison of CPU usage between a virtual desktop server according to the present invention and virtual desktop servers according to existing technologies.

FIG. 4 is a graph for comparison of CPU usage between a client according to the present invention and clients according to existing technologies.

FIG. 5 is a graph for comparison between network traffic between the present invention and network traffic according to existing technologies.

FIG. 6 is a graph for comparison of a frame rate according to the present invention and a frame rate according to existing technologies.

MODE FOR THE INVENTION

Hereinafter, with reference to accompanying drawings, embodiments of the present invention are described in detail to allow those skilled in the art to easily implement the embodiments. The present invention may, however, be embodied in many different forms and should not be construed as being limited to the embodiments set forth herein. In addition, some portions unrelated to the descriptions are omitted for clarity of the descriptions, and like reference numerals generally denote like elements in the description of each drawing.

Throughout the specification, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof. In addition, an expression such as "unit" indicates a unit of performing at least one function or operation, and it may be implemented as hardware, software, or a combination of hardware and software.

FIG. 1 is a flowchart illustrating a method of providing content by use of a web-based virtual desktop protocol according to an embodiment of the present invention. Hereinafter, with reference to FIG. 1, there is provided description about a method or providing content by an apparatus of using a virtual desktop protocol (hereinafter, referred to as a virtual desktop server) according to the present invention.

A virtual desktop server may provide at least one virtual desktop to a client. To this end, the virtual desktop server may allocate at least one virtual desktop to each client.

In order to provide a screen of a virtual desktop to a client, the virtual desktop server may capture the screen of the virtual desktop allocated to the client in S110. Then, the virtual desktop server may classify the captured screen.

According to an embodiment, based on the above classification, the virtual desktop server may compress the captured screen into a specific image format. The specific image format may include, for example, Joint Photographic Coding Experts Group (JPEG) and Portable Network Graphics (PNG). In this case, the virtual desktop server may compress the captured screen into the most suitable format between JPEG and PNG based on the above classification. Of course, JPEG and PNG are merely exemplary, and the specific image format in this embodiment may include other various image formats, apart from JPEG and PNG.

To this end, the virtual desktop server may calculate an entropy value of the captured screen, and determine a compression format suitable for the captured screen or image among various image formats (e.g., JPEG and PNG) according to the entropy value. That is, network traffic may be reduced by use of a multi-codec. For example, the virtual desktop server may calculate an entropy value of the captured screen based on the following Equation 1.

$$E = \frac{-\sum_{1}^{h}\sum_{i=1}^{w}(p_i * \log_2(p_i))}{h} \quad [\text{Math. 1}]$$

wherein E denotes an entropy value of an image, h denotes height of the image, w denotes width of the image, and Pi denotes a probability or frequency distribution for all pixels at the i-th row (scanline) of the image. The above Equation 1 may be derived based on an PNG filter and Shannon Entropy Algorithm.

In another embodiment, the virtual desktop server is able to adjust encoding quality and/or frame of content to be provided to a client. The encoding quality and/or frame of content may be adjusted based on a network status of the client. For example, the virtual desktop server may determine encoding quality by monitoring a network status of the client in S130. To this end, the virtual desktop server may monitor the network status of the client periodically or at a time when a compression format is determined. Here, information on the network status of the client may be acquired by monitoring a transmission buffer of the virtual desktop and calculating a network bandwidth of the client. It is because the client is not capable of monitoring the network status by itself. If it is determined that the network quality is bad, the virtual desktop server may encode a corresponding screen with low-quality for the purpose of seamlessly provision of a service. On contrary, if it is determined that the network quality is good, the virtual desktop server may encode the corresponding screen with high-quality.

In addition, the virtual desktop server may determine size of the content and adjust size (or resolution) of the corresponding screen (or image) in S140. The virtual desktop server may further reduce network traffic by compressing the content into size suitable for a user device. For example, the virtual desktop server may perform operation S140 based on resolution of a web browser of the client, which is acquired by monitoring of the user device. For example, if the resolution of the web browser is lower than resolution of the virtual desktop server, the virtual desktop server may adjust the size of the corresponding screen in order to reduce network traffic.

The virtual desktop server may adaptively encode the content in the above-described procedures in S150 and provide the encoded content to the client in S160, and the client may display the content, received from the virtual desktop server, through the web browser.

In yet another embodiment, the virtual desktop serer may perform direct communication with the web browser of the client based on websocket. To this end, each of the virtual desktop server and the client may include a connection managing unit. By using the connection managing unit, the client may transmit, to the virtual desktop server, control information on at least one of a mouse, a keyboard, and a screen of the virtual desktop. Based on the control information received from the client, the virtual desktop server may control an input/output operation and a mapping operation of the mouse, the keyboard, and the screen.

FIG. 2 is a block diagram illustrating a server and a client, both of which utilize a web-based virtual desktop protocol according to an embodiment of the present invention.

Referring to FIG. 2, a virtual desktop server 200 includes a control unit 201, a monitor 202, an encoder 203, and a connection managing unit 204, and a client 250 includes a control unit 251 and a connection managing unit 252. Although not illustrated in the drawings, the client 250 according to another embodiment may further include a monitor in addition to the control unit 251 and the connection managing unit 252, the monitor which is used to output a video or image received from the virtual desktop server 200.

The control unit 201, which controls overall operation of the virtual desktop server 200, may perform the following operations: allocating at least one virtual desktop to the client 250, capturing a screen of the virtual desktop; and controlling encoding quality of content based on a network status of the client 250.

To this end, a monitor 202 includes a buffer monitor and a network analyzer so as to monitor information on the network status of the client 250 and information on a web browser of the client. For example, the monitor 202 may acquires information on the network status of the client by monitoring a transmission buffer of the virtual desktop server 200 and calculating a network bandwidth of the client. In addition, the monitor 202 may monitor resolution of the web browser of the client 250.

The control unit 201 may control encoding quality, a frame, and size of content based on information monitored by the monitor 202. Specifically, the control unit 201 may calculate an entropy value of the captured screen of the virtual desktop screen, and determine a compression format for the captured screen based on the entropy value. At this point, the control unit 201 may classify the captured screen, so that the captured screen is compressed into one format between JPEG and PNG based on an equation which is derived based on a PNG filter or Shannon Entropy Algorithm. Thus, the control unit 201 provides the content in a format supported by the web browser and therefore the client 250 does not need an additional decoder.

The encoder 203 adaptively encodes the content by control of the control unit 201. To this end, the encoder 203 may include a JPEG encoder and a PNG encoder.

The connection managing unit 204 manages connection to the client 250, and may perform direct communication with the web browser of the client 250 based on the websocket. Thus, network delay due to a proxy server may be removed.

When the control information on at least one of the mouse, the keyboard, and the screen of the virtual desktop is received from the client 250 through the connection managing unit 205, the control unit 201 may control the mouse, the keyboard, and the screen based on the received control information. To this end, the control unit 210 may include a screen capture, a mouse handler, and a keyboard handler.

Meanwhile, as the control unit 251 of the client 250 includes a canvas control unit, a mouse receiver, and a keyboard receiver, the control unit 251 may receive a keyboard input, a mouse input, etc. from a user and may display content, which is received from the virtual desktop server 200, on a canvas by controlling the web browser.

The connection managing unit 252 may manage connection to the connection managing unit 204 of the virtual desktop server 200.

FIG. 3 is a graph for comparison of CPU usage between a virtual desktop server according to the present invention and virtual desktop servers according to existing technologies, FIG. 4 is a graph for comparison of CPU usage between a client according to the present invention and clients according to existing technologies, FIG. 5 is a graph for comparison between network traffic between the present invention and network traffic according to existing technologies, and FIG. 6 is a graph for comparison of a frame rate according to the present invention and a frame rate according to existing technologies.

Referring to FIGS. 3 to 6, the present invention and perform the existing technologies are compared based on four scenarios (DOCUMENT, INTERNET, 320p VIDEO, 720p VIDEO).

FIGS. 3 and 4 are results of comparison of CPU usage of a virtual desktop server and a client. First, referring to FIG. 3, the graphic processing procedure of the present invention (WARP) is performed largely by a server, and thus the average CPU usage is increased by 15% on average, compared with the existing methods (noVNC and SPICE-HTML5). On the other hand, referring to FIG. 4, the CPU usage of a client (a web browser) is decreased by 38% on average.

Referring to FIG. 5, the present invention utilizes an adaptive encoder to reduce network traffic and thus it shows an average of 52% reduction in network traffic compared with the existing technologies. Lastly, referring to FIG. 6, the frame rate measurement of the prevent invention is increased by 9 frames on average, compared with the existing technologies, and therefore, it is proved that the web-based virtual desktop protocol according to the present invention exhibits excellent performance.

The virtual desktop server according to the present invention may include at least one of a processor, a storage device, an output interface for outputting a result of the processor, an input interface for receiving information from a user, and a communication module for transmitting and receiving data over a wired or wireless network. Here, the processor may include application-specific integrated circuit (ASIC), a different chip set, a logical circuit, and/or a data processing device. The storage device may include a disk drive, a read-only memory (ROM), a random access memory (RAM), a flash memory, a memory card, and a storage medium. The communication module may be configured as a Radio Frequency (RF) antenna or modem, and it may especially include a baseband circuit for processing a wireless signal.

When the above-described embodiments are implemented as software, operations of the virtual desktop server according to the specification may be implemented by the above processor, storage device, output interface, input interface, and communication module. The web-based virtual desktop protocol according to the specification may be stored in a memory and implemented by a processor. The memory may be located inside or outside the processor, and may be connected to the processor through various well-known means.

The invention claimed is:

1. A method of providing content by an apparatus of using a web-based virtual desktop protocol, the method comprising:

allocating at least one virtual desktop to a client;
capturing a screen of the at least one virtual desktop allocated to the client;
calculating an entropy value of the captured screen;
determining a compression format for the captured screen based on the calculated entropy value;
monitoring a network status of the client;
adjusting encoding quality of the content based on the network status of the client; and
providing the content of the adjusted encoding quality to the client,
wherein the content of the adjusted encoding quality is displayed through a web browser of the client,
wherein one of Joint Photographic Coding Experts Group (JPEG) and Portable Network Graphics (PNG) is determined to be the compression format for the captured screen, and
wherein the calculating comprises calculating the entropy value of the captured screen based on the following equation:

$$E = \frac{-\sum_{1}^{h}\sum_{i=1}^{w}(p_i^* \log_2(p_i))}{h},$$

wherein E denotes the entropy value of an image corresponding to the captured screen, h denotes a height of the image, w denotes a width of the image, and $p_i$ denotes a probability or frequency distribution for all pixels at an i-th row of the image.

2. The method of claim 1, wherein the network status of the client is acquired by monitoring a transmission buffer of the apparatus and acquiring a network bandwidth of the client.

3. The method of claim 1, wherein the adjusting comprises:
monitoring resolution of the web browser of the client; and
adjusting size of the content according to the resolution of the web browser.

4. The method of claim 1, wherein the adjusting comprises adjusting a frame of the content based on the network status.

5. The method of claim 1, further comprising:
receiving control information on at least one of a mouse, a keyboard, and a screen of the at least one virtual desktop from the client; and
controlling the mouse, the keyboard, and the screen based on the received control information.

6. An apparatus of using a web-based virtual desktop protocol, comprising:
a processor configured to:
allocate at least one virtual desktop to a client;
capture a screen of the at least one virtual desktop allocated to the client;
calculate an entropy value of the captured screen;
determine a compression format for the captured screen based on the calculated entropy value;
monitor a network status of a client;
control encoding quality of content based on the network status of the client;
encode the content by control of the control unit; and
manage connection with the client,
wherein the encoded content is provided to the client and displayed through a web browser of the client,
wherein one of Joint Photographic Coding Experts Group (JPEG) and Portable Network Graphics (PNG) is determined to be the compression format for the captured screen, and
wherein the entropy value of the captured screen is calculated based on the following equation:

$$E = \frac{-\sum_{1}^{h}\sum_{i=1}^{w}(p_i^* \log_2(p_i))}{h},$$

wherein E denotes the entropy value of an image corresponding to the captured screen, h denotes a height of the image, w denotes a width of the image, and $p_i$ denotes a probability or frequency distribution for all pixels at an i-th row of the image.

7. The apparatus of claim 6, wherein the processor acquires information on the network status of the client by monitoring a transmission buffer of the apparatus and calculating a network bandwidth of the client.

8. The apparatus of claim 6, wherein the processor monitors resolution of the web browser of the client, and controls size of the content according to the resolution of the web browser.

9. The apparatus of claim 6, wherein the processor controls a frame of the content based on the network status.

10. The apparatus of claim 6, wherein, when control information on at least one of a mouse, a keyboard, and a screen of the at least one virtual desktop is received from the client, the processor controls the mouse, the keyboard, and the screen based on the received control information.

* * * * *